United States Patent [19]

Brackus

[11] Patent Number: 5,446,991
[45] Date of Patent: Sep. 5, 1995

[54] FISHING LURE WITH BUOYANT BODY PORTION

[76] Inventor: Michael J. Brackus, P.O. Box 5094, Palatine, Ill. 60078-5094

[21] Appl. No.: 216,043

[22] Filed: Mar. 22, 1994

[51] Int. Cl.⁶ .............................................. A01K 85/00
[52] U.S. Cl. ................... 43/42.37; 43/42.25
[58] Field of Search .............. 43/42.22, 42.25, 42.37, 43/42.53, 42.37; D22/128

[56] References Cited

U.S. PATENT DOCUMENTS

| | | | |
|---|---|---|---|
| 1,842,490 | 1/1932 | Pysher | 43/42.22 |
| 2,476,733 | 7/1949 | Jacobs | 43/42.25 |
| 2,793,461 | 5/1957 | Korte | 43/42.37 |
| 3,323,248 | 6/1967 | Sutryn | 43/42.25 |
| 3,758,976 | 9/1973 | Szwolkon | 43/42.37 |
| 4,559,736 | 12/1985 | Sienkiewirz | 43/42.25 |
| 4,790,101 | 12/1988 | Craddock | 43/42.37 |
| 5,261,183 | 11/1993 | Dworski | 43/42.37 |

FOREIGN PATENT DOCUMENTS

| | | | |
|---|---|---|---|
| 1200511 | 7/1970 | United Kingdom | 43/42.25 |
| 2011771 | 7/1979 | United Kingdom | 43/42.25 |

*Primary Examiner*—Kurt Rowan
*Attorney, Agent, or Firm*—Welsh & Katz, Ltd.

[57] ABSTRACT

A fishing lure includes a fishing hook having a shank with a portion of the shank defining a longitudinal axis. The buoyant body portion on the shank has a portion of the shank substantially disposed within. The body portion provides an increased diameter over the diameter of the shank for accepting fly-tying materials affixed to the body portion. The body portion includes at least two segments, each segment having a constant diameter along its entire length different from the diameter of an adjacent segment. This provides a step-like formation facilitating the attachment of the fly-tying materials. The fishing lure includes a weight attached near the eye such that the lure sinks in water. When submerged, the barbed end of the hook remains elevated by the buoyant body portion relative to the weighted end.

17 Claims, 4 Drawing Sheets

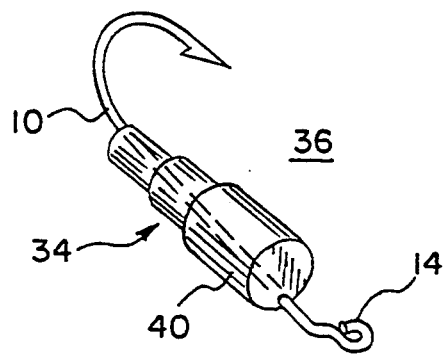
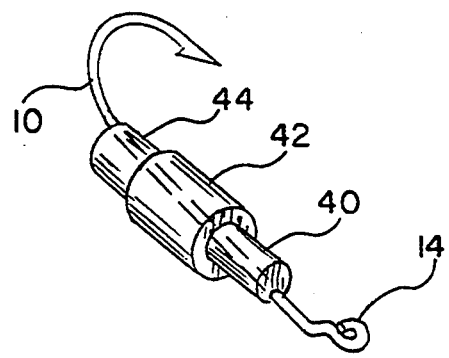
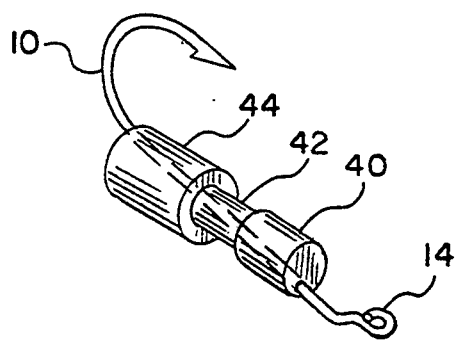
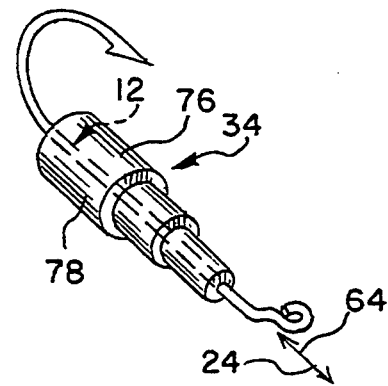
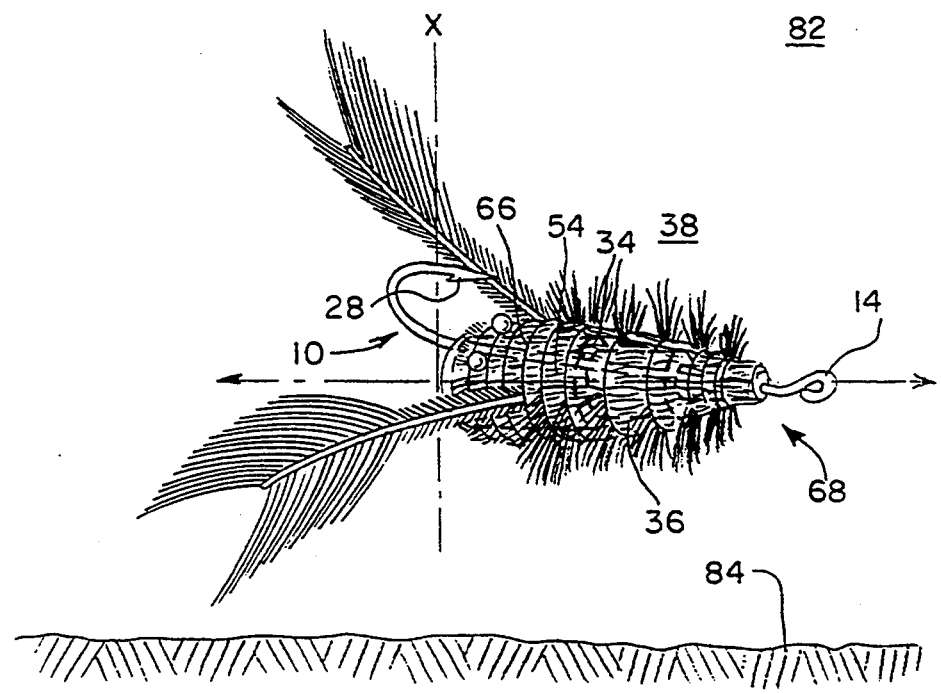

FISHING LURE WITH BUOYANT BODY PORTION

BACKGROUND

This invention relates to fishing lures and more particularly, to fishing lures with a buoyant body portion to which fly-tying materials are attached to simulate lifelike insects and animals.

In recent years, the sport of fishing as evolved into a multimillion dollar industry, with millions of dollars spent annually on boats, fishing tackle and lures. With the increased interest and emphasis on fishing for popular fresh water game fish such as black bass, crappie, trout and the like, came a rapid expansion in the development and marketing of improved fishing tackle and new bait, and improved lures in particular.

Success in catching fish increases when lifelike bait is used. In particular, coloration, movement, and body attitude in the water are important considerations. Body appearance which more closely resembles the live bait also increases fishing productivity.

The depth in the water at which the lure remains is also significant. Faster moving currents typically exist at the upper surfaces of streams and lakes than at lower depths. To conserve energy, some fish avoid the fast moving currents and prefer to remain at lower depths, coming to the surface only to feed.

Lures which are heavier than water drop to the bottom and do not realistically simulate the proper body attitude and position of the insect or animal. Additionally, these lures are prone to becoming snagged on rocks, logs, and other obstructions.

Some lures or flies are light enough to float on the surface when initially cast into the water. However, when the hackles or feathers become saturated, the lure can sink.

It is known to use floating materials to construct lures so that the lure will float. These lures may then be weighted with lead weights, known as sinkers, attached to the fishing line so that the lure sinks. However, simply attaching a sinker to the fishing line does not improve the lure's resistance to snags, nor is a proper body attitude maintained.

To construct floating lures, it is known to used buoyant materials that are typically attached to the hook to give the lure body a positive buoyancy. Fly-tying materials such as feathers, hackles, beads, foil, threads, plastic, and tinsel are then attached to the lure body by winding thread around the materials to give a lifelike appearance.

Typical floatation materials are spongy in consistency and present problems when the fly-tying material is attached thereto. The floatation material is compressed by the thread windings and the fly-tying material generally cannot be easily secured to the lure body. Often, the fly-tying materials become loose and eventually detach from the lure body wherein the lure unwinds and falls apart. Frequently, to overcome the above-described problem, an initial winding of thread is applied to compress the foam material prior to attachment of the fly-tying materials. This results in time consuming, expensive, and unnecessary steps.

The shape of the flotation material is typically oblong, being thicker in the middle than at the ends of the lure body. Since at least one end of the floatation material tapers, it is difficult to fasten the fly-tying materials by winding the thread around this portion. The taper allows the thread holding the fly-tying materials to slip or unwind. Thus, allowing the lure to come apart.

Since the lure body typically extends along the entire shank of the hook, it can interfere with the hooking ability of the hook by decreasing the gap distance. When gap distance is decreased, it is more difficult to hook the fish since less of the effective part of the hook is exposed.

SUMMARY

The above disadvantages of the above-described fishing lures are substantially overcome by the present invention by providing a fishing lure with a buoyant body portion that provides a step-like formation facilitating the attachment of fly-tying materials thereto.

Accordingly, it is an object of the present invention to provide a fishing lure that substantially overcomes the above problems.

It is another object of the present invention to provide a fishing lure having a buoyant body portion.

It is further object of the present invention to provide a fishing lure having a step-shaped body portion having multiple segments such that the diameter of each segment is constant and subsequent segments increases in diameter from first segment to last segment for providing a streamlined contour.

It is still another object of the present invention to provide a fishing lure such that the segments provide a cylindrical surface and a shoulder portion upon which fly-tying materials can be easily and securely fastened.

It is yet another object of the present invention to provide a fishing lure with a balanced weight such that the lure sinks in water with the barbed end of the hook elevated by the buoyant body portion relative to the weighted end.

It is further object of the present invention to provide a fishing lure that is resistant to becoming snagged on obstructions.

It is still a further object of the present invention to provide a fishing lure that realistically mimics the appearance and motion of a live object such that fish are attracted.

The fishing lure according to the present invention provides a buoyant body portion integrally formed with a fishing hook encapsulated therein. The body portion includes three segments wherein each segment has a constant diameter along its length. The diameter of successive segments increases from the eye of the hook towards the curved end of the shank. Fly-tying materials are easily secured to the surface of the segments by windings of thread. Because the shape of the segments are cylindrical, thus having parallel walls, the thread does not slip when tightly wound around the fly-tying materials and the segment.

The streamlined contour reduces the drag and allows the lure to sink using a lighter weight when subjected to water currents. The weight of the lure is important since a fish is not as easily caught if the lure is heavy compared to its live counterpart due to the manner in which the fish creates suction when it opens its mouth to strike. Also, lighter lures provide greater sensitivity to the person fishing for determining whether a fish strike has occurred.

A balanced dumbbell shaped weight may be positioned near the eye of the hook and transverse to the longitudinal axis of the shank. However, any suitable shape such as a flattened or elongated shape may be used. The weight not only causes the lure to sink in water, but also gives the lure the appearance of having a tail, thus, increasing the lure's lifelike image. Since the weight is evenly distributed on each side of the body portion, the lure remains balanced such that the plane of the curvature of the hook is perpendicular to the bottom of the body of water. When the lure is submerged, the barbed end of the hook remains elevated by the buoyant body portion relative to the weighted end. Thus, the hook remains upright with the barbed end positioned toward the top of the water, rather than toward the bottom of the body of water. This allows the lure to be snag-resistant and realistically simulates the body posture of animals upon which fish feed, such as a crayfish. Additionally, since the hook is upright, the hook tends to more easily penetrate the soft tissue of the roof of the mouth, thus, hooking the fish.

More specifically, the fishing lure includes a fishing hook having a shank with a first end and a second opposing end such that the first and second ends define a longitudinal axis of the shank. The shank includes an eye portion attached to the first end, a curved portion attached to the second end of the shank, and a barbed portion attached to the other end of the curved portion. The curved portion curves away from the longitudinal axis of the shank.

The buoyant body portion is disposed on the shank with a portion of the shank being substantially within the body portion. The body portion provides an increased diameter over the diameter of the shank for accepting fly-tying materials affixed to the body portion. The body portion includes at least two segments, each segment having a length and having a substantially constant diameter along its entire length different from the constant diameter of an adjacent segment. This provides a step-like formation facilitating the attachment of fly-tying materials. The length of the two segments define a longitudinal axis of the segments where the longitudinal axis further defines a top portion of the body portion and a bottom portion of the body portion, where the top and bottom portion are oppositely disposed along the longitudinal axis. The longitudinal axis of said segments diverges from the longitudinal axis of the shank. Thus, the top portion is larger than the bottom portion. The fishing lure includes a weight attached near the eye of the hook such that the lure sinks in water. When submerged, the barbed end of the hook remains elevated by the buoyant body portion relative to the weighted end.

BRIEF DESCRIPTION OF THE DRAWINGS

FIG. 7A is a perspective view depicting an alternate embodiment of the present invention wherein the first segment is larger in diameter than subsequent segments;

FIG. 7B is a perspective view depicting an alternate embodiment of the present invention wherein the middle segment is larger in diameter than other segments;

FIG. 7C is a perspective view depicting an alternate embodiment of the present invention wherein the middle segment is smaller in diameter than other segments;

FIG. 8 is a perspective view depicting an alternate embodiment of the present invention wherein the longitudinal axis of the body portion is coaxial with the longitudinal axis of the shank.

FIG. 9 is a view depicting an alternate embodiment of the present invention wherein the lure is constructed without a weight port.

DETAILED DESCRIPTION OF THE PREFERRED EMBODIMENTS

Figure 1:
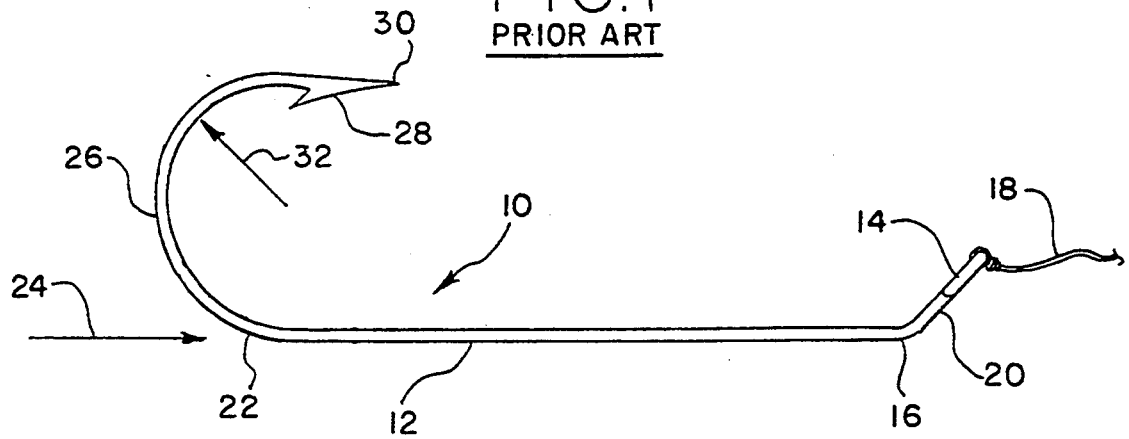
FIG. 1 is a perspective view depicting a known fishing hook in accordance with the presence invention.

Referring now to FIG. 1, a known fishing hook 10 is shown. The fishing hook includes a shank portion 12 which is generally straight but may have a slight curve, all as known in the art and generally commercially available. An eye 14 attaches to a first end 16 of the shank so that a fishing line 18 may be attached thereto. The shank may have an angled portion 20 connecting the eye 14 to the first end of the shank 16. The angled portion 20 may be upturned, downturned, or straight. The first end 16 and a second end 22 substantially opposite the first end, define a longitudinal axis 24 of the shank 12.

A curved portion 26 formed at the second end 22 of the shank 12 curves away from the longitudinal axis 24 of the shank wherein a barbed end 28 is formed at the curved portion and having a piercing tip 30. The curve is of a sufficient radius 32 such that the barbed end 28 is substantially parallel to the shank portion 12.

Figure 2A:
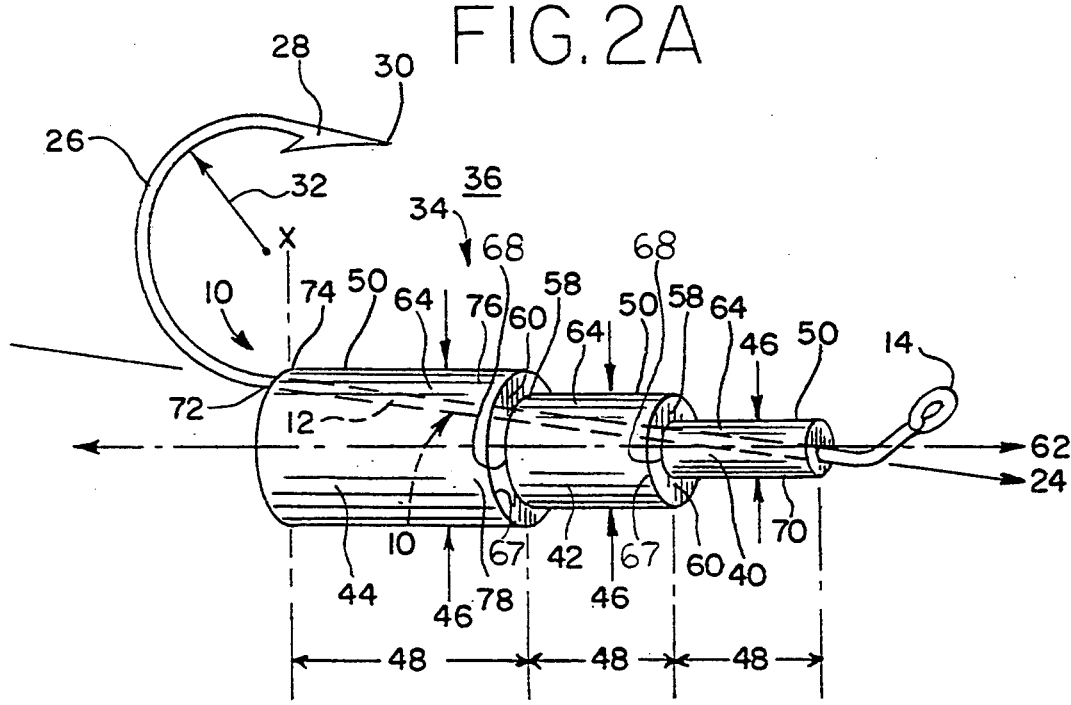
FIG. 2A is a perspective view depicting a buoyant body portion and the hook of FIG. 1 disposed within the body portion in accordance with the presence invention.
Figure 2B:
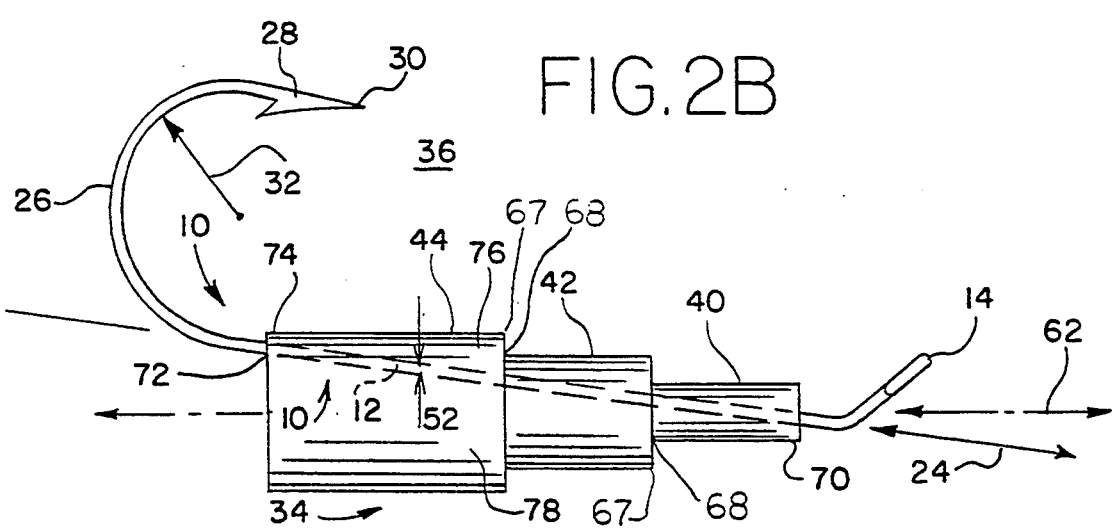
FIG. 2B is a side elevational view of the view shown in FIG. 2A.
Figure 3:
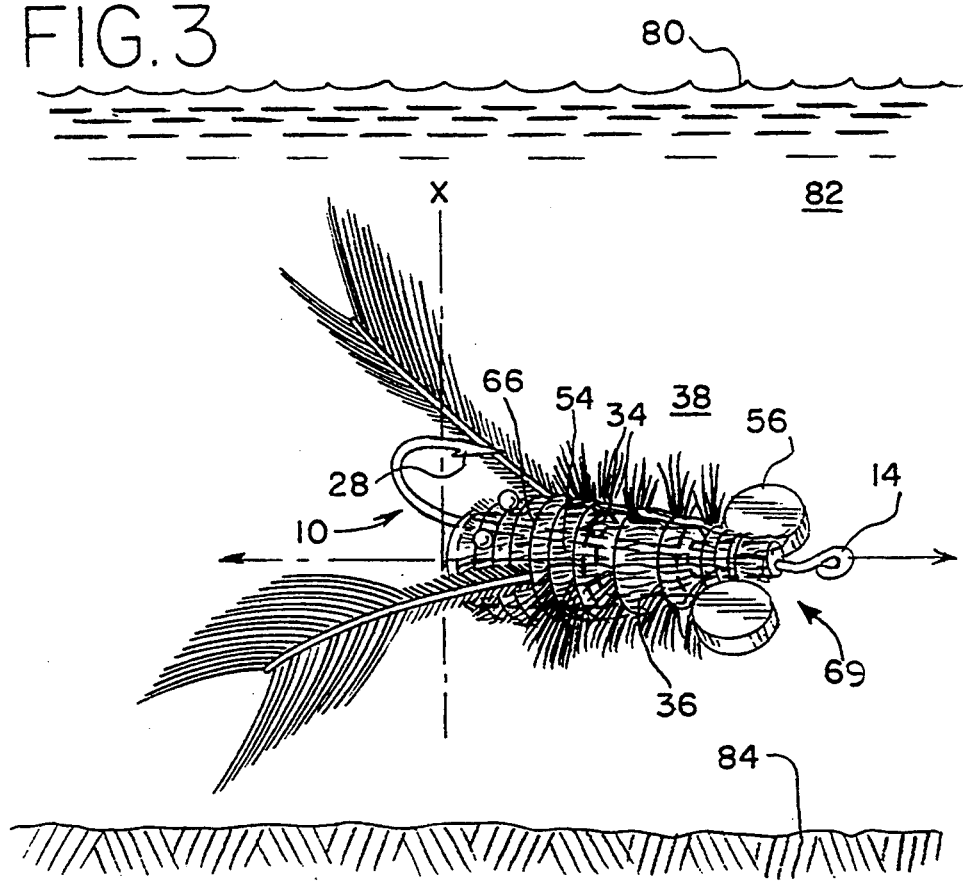
FIG. 3 is a perspective view depicting the fishing lure shown with fly-tying materials secured to the buoyant body portion in accordance with the presence invention.

Referring now to FIGS. 2A, 2B, and 3, a body portion 34 is formed such that the shank 12 is substantially encapsulated within the body portion, forming the jighead portion 36 of the fishing lure 38. The hook 10 is integral with body portion 34 and cannot become dislodged from the body portion as is the case with buoyant materials that are tied or clamped to the hook.

The body portion 34 includes a first segment 40, a second segment 42, and a third segment 44 where each segment has a constant diameter 46 along its length 48. Thus, each segment appears as a cylinder with parallel and concentric side walls 50. Although three segments are preferable, any number of segments may be used. The first segment 40 disposed near the eye 14 has a smaller diameter than subsequent segments. Each segment increases in diameter relative to its distance from the first segment 40, while being constant in diameter along the length 48 of the segment. The segments 40–44 of the body portion 34 provide an increased diameter over the diameter 52 of the shank 12 for accepting a variety of fly-tying materials 54. Thus, the body portion 34 imparts a generally streamlined contour.

The boundary 58 between adjacent segments forms a planar surface or shoulder 60 at right angles to a longitudinal axis 62 of the segments. Each segment 40–44 provides a cylindrical surface 64 separated by the shoulder 60 between segments giving the body portion 34 a symmetrical step-like contour.

The shoulder 60 separating the segments 40–44 also provides a surface against which the fly-tying materials 54 may be snugly positioned and firmly secured with a winding of thread 66. Such a shoulder 60 assures that the fly-tying materials 54 will not become dislodged even after rough treatment and repeated use. Fly-tying materials 54, such as a feather, are initially fastened to the third segment 44 with a few spiral windings of thread 66. As the thread 66 is tightly wound around the third segment 44 near the shoulder portion 60, the fly-tying materials 54 are pinched or bent at two points at each segment boundary. The fly-tying material 54 is first pinched at a first corner 67 formed where the cylindrical surface 64 of the third segment 44 meets the shoulder 60. The fly-tying material 54 is pinched again at a second corner 68 formed where the shoulder 60 and the cylindrical surface 64 of the second segment 42 meet, but this time, the fly-tying material is pinched or bent in an opposite direction. This double pinching or bending of the fly-tying material 54 is repeated again at the shoulder 60 between the second segment 42 and the first segment 40. This serves to firmly and easily secure the fly-tying materials 54 in place. Thus, the fly-tying materials 54 are tightly bound and conform to the step-like shape of the body portion 34. Additionally, since the shape of the body portion 34 is tapered in a step-like manner, less thread 66 is needed to bind the fly-materials 54 than if the diameter of the body portion was constant throughout its length.

Since each segment 40–44 has a constant diameter 46 along its length 48, the fly-tying materials 54 are easily secured to the surface by the thread 66. Because the shape of the segments 40–44 is cylindrical with concentric and parallel side walls 50, the thread 66 does not slip when tightly wound around the fly-tying materials 54 and the segment.

Additionally, the consistency of body portion 34 material is sufficiently firm such that the thread 66 used to attach the fly-tying materials 54 does not significantly compress the body material. Materials which significantly compress or deform prevent the thread 66 from securely holding the fly-tying materials 54 in place. However, the consistency of the body portion 34 material is sufficiently compressible such that it provides a good gripping surface against which the fly-tying materials 54 may be bound.

The body portion 34 is constructed of material which is lighter than water, thus is buoyant. The body portion 34 material is preferably a foamed plastic material and is sufficiently buoyant to allow the hook 10, the body portion and the fly-tying materials 54 attached thereto to float in water. However, since many fish tend to remain towards the bottom of the stream or lake, a lure which sinks is preferable. To cause the lure 38 to sink, the weight 56, such as a lead weight, is secured to the first segment 40 of the body portion 34 nearest the eye 14. The weight 56 is preferably shaped like a dumbbell 69 and is positioned transverse to the longitudinal axis 24 of the shank 12. However, any suitable shape such as flattened, elongated, or cylindrical shape may be used.

The longitudinal axis 24 of the shank 12 is preferably not coaxial with the longitudinal axis 62 of the segments 40–44. Rather, the longitudinal axis 24 of the shank 12 and the longitudinal axis 62 of the segments meet near a beginning 70 of the first segment 40 and diverge toward the barbed end 28 of the hook until the shank 12 exits the body portion 34 substantially near an end 72 of the third segment 44 near an outside edge 74 of the third segment. Thus, the longitudinal axis 24 of the shank 12 within the body portion 34 defines a top portion 76 and a bottom portion 78 of the body, where the top and bottom portions are oppositely disposed along the longitudinal axis of the shank. This creates a top portion 76 which is smaller than the bottom portion 78. Additionally, the natural orientation of the fishing lure 38, when submerged, is such that the top portion 76 is disposed toward an upper surface 80 of a body of water 82. Thus, the barbed end 28 of the hook 10 remains positioned toward the surface 80, rather than towards a bottom 84 of the body of water 82.

Additionally, the end 72 of the third segment 44 extends along the shank 12 past the tip of the barb 30 as shown by line "X". This increases the lure's 38 ability to resist snags since the top of the barb 30 cannot easily contact the obstructions. However, this does not interfere with hooking effectiveness of the hook 10 when a fish attempts to take the bait. Due to the radius 32 of the curved portion 26 of the hook and the offset of the body portion 34 relative to the shank 12, most of the curved portion of the hook and the barb 28 are exposed to facilitate hooking the fish.

Figure 4:
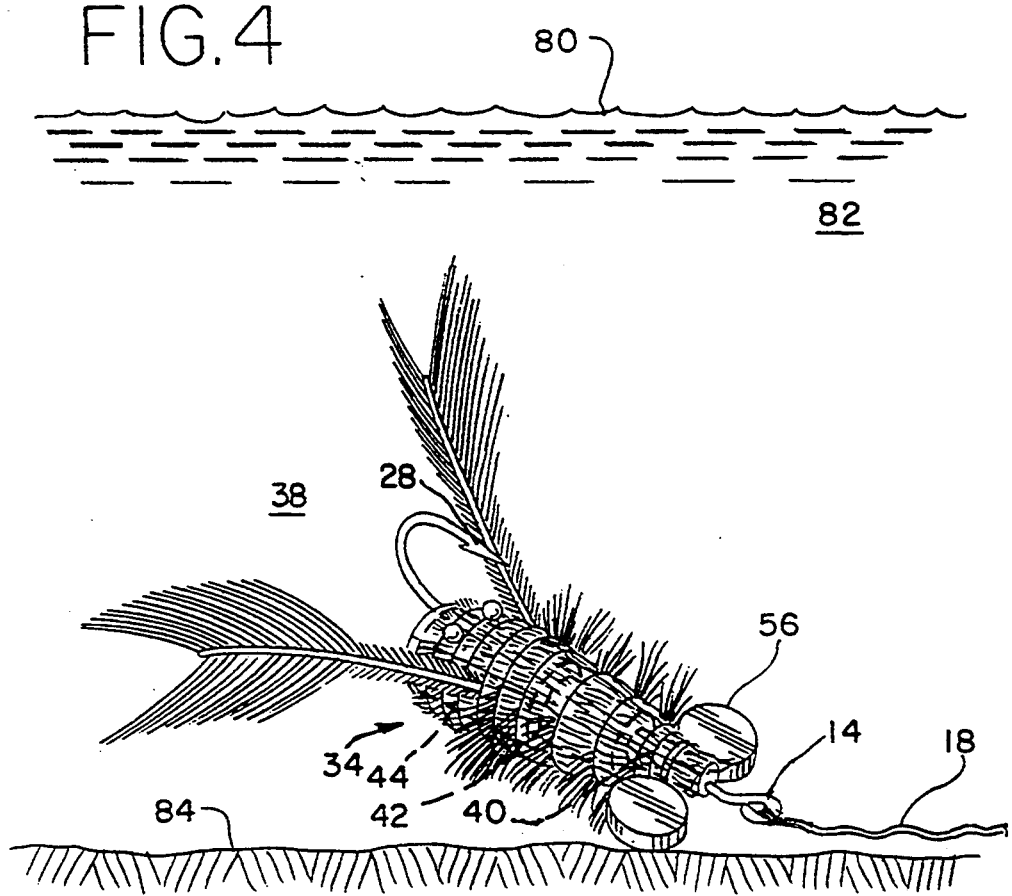
FIG. 4 is a side elevational view of the fishing hook and the buoyant body portion depicting the attitude of the lure when submerged in water.
Figure 5:
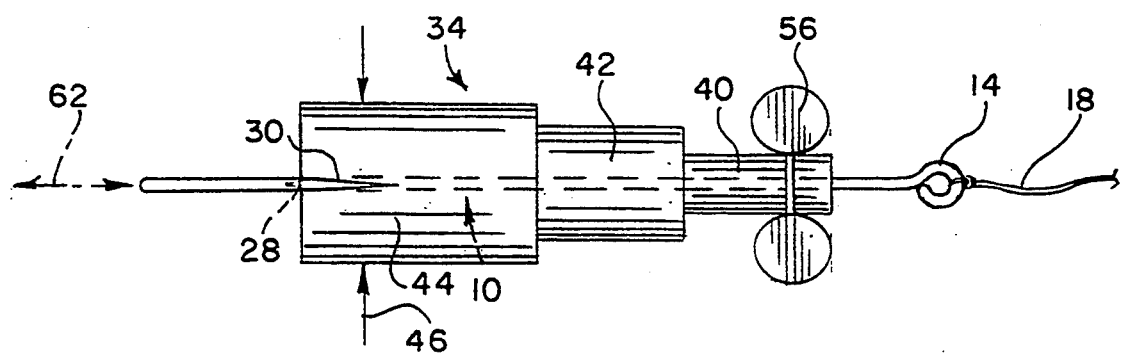
FIG. 5 is a top plan view depicting the buoyant body portion and the hook of FIG. 1 disposed within the body portion in accordance with the presence invention.

Referring now to FIGS. 4 and 5, FIG. 4 shows the lure 38 submerged in the water 82. The weight 56 attached to the first segment 40 causes the entire fishing lure 38 to sink. However, the buoyancy of the buoyant body portion 34 elevates the body portion relative to the weighted end. Thus, the fishing lure 38 remains positioned on the bottom 84 of the body of water 82 with the barb end 28 raised higher than the eye 14. When pulled along by the fishing line 18, the fishing lure 38 is displaced relative to the bottom 84. When the tension in the fishing line 18 is relaxed, the fishing lure 38 once again sinks towards the bottom at the same characteristic angle as when resting on the bottom. This angle realistically simulates the body posture of animals upon which fish feed, such as a crayfish.

The fishing lure 38 is resistant to becoming snagged on logs, rocks, and other obstacles when "reeled-in", due to the unique shape and orientation of the body portion 34. Since the third segment 44 is greater in diameter that the first segment 40, the width 46 of the third segment tends to keep the barbed end 28 of the hook away from obstructions by providing a physical mass blocking the barb tip 30 from contacting the obstructions.

The weight 56 is symmetric and positioned transverse to the longitudinal axis 62 of the body portion 34. Since the weight 56 is evenly distributed on each side of the body portion 34, the lure 38 remains balanced such that the plane of the curvature of the hook is perpendicular to the bottom 84 of the body of water 82. Thus, the hook 10 remains upright with the barbed end 28 positioned toward the top 80 of the body of water 82, rather than toward the bottom of the body of water.

Since the fishing lure 38 sinks with the weighted 56 end lower than the barbed end 28, and the barbed end remains upright towards the top 80 of the water 82, the barbed end effectively stays suspended away from the bottom of body of water. When the lure is pulled along by the fishing line 18, the barbed end 28 is not dragged across the bottom 84 where it is prone to becoming snagged.

Although the buoyant body portion 34 is not sufficiently buoyant to counteract the full effect of the weight 56, it does allow the lure 38 to sink slowly and to remain suspended in the water to a limited degree. The bottom portion 78 of the body portion 34 will first contact any obstruction tending to move the lure 38 away from the obstruction. The lure 38 will essentially float or bounce away from the obstruction, thus, avoiding snags.

The body portion 34 material easily and readily accepts pigmentation 86. This allows the body portion 34 to be painted to increase realism. The body portion 34 may be counter-shaded such that the bottom portion 78 is lighter in color and the top portion 76 is darker in color. This simulates the natural coloration of many insects and animals and increases the lure's effectiveness.

Figure 6:
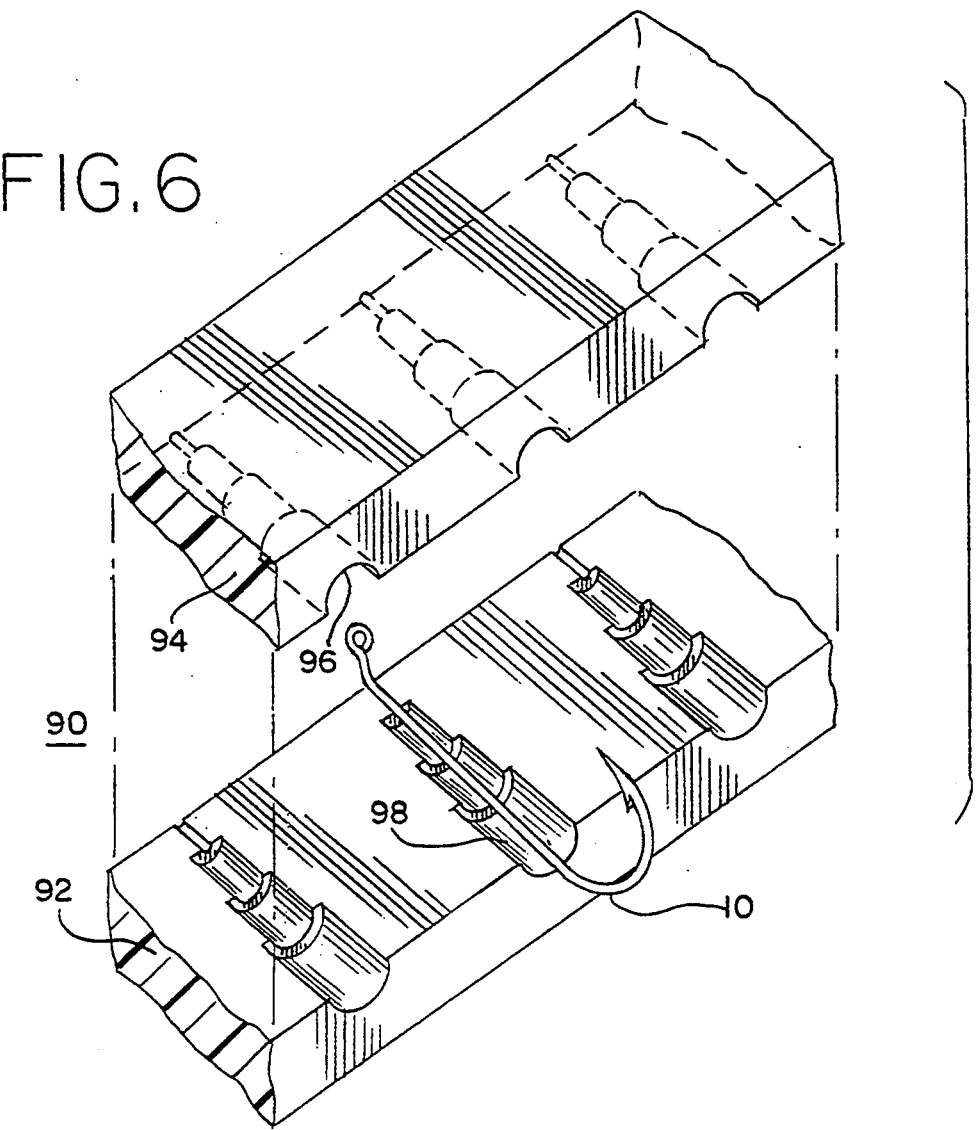
FIG. 6 is a perspective view depicting the mold used to form the buoyant body portion.

Referring now to FIGS. 3 and 6, the component material used to form the body portion 34 may be a polyurethane manufactured by Hilts Mold and Manufacturing Corporation, 1461 East Lake Meade Drive, Henderson, Nev. 89015 such as Hilts Molds foam components. The pigmentation 36 may also be added to the component material to impart a color. The body 34 material is formed by an exothermic reaction between a polyol, an isocyanate catalyst, and water, as known in the art. The two components of the Hilt Mold product are mixed together in equal quantities and are then poured or inserted into a mold 90. However, other suitable foamed materials may be used. The mold 90 includes a bottom half 92 and a corresponding top half 94 such that a cavity in the top half 96 aligns with a cavity in the bottom half 98 forming a volume. Although only one cavity is shown, the mold 90 may contain multiple cavities which may be of varying dimensions such that many jigheads 36 can be formed at one time.

The fishing 10 hook is placed in the bottom half cavity 98 and the top half of the mold 94 is securely affixed to the bottom half. Next, the mixed liquid is poured into the cavity and allowed to solidify. When the liquid has solidified, the mold 90 halves are separated leaving a buoyant body portion 34 with the fishing hook 10 disposed within. Any suitable form of manufacture may be used such as insertion molding, the method described above, or any other suitable methods.

Referring now to FIG. 7A, an alternate embodiment is shown. The jighead 36 is formed such that the first segment 40 disposed near the eye 14 of the hook 10 has the largest diameter while each subsequent segment decreases in diameter relative to its distance from the first segment. Thus, the body portion 34 has a blunt shape.

Referring now to FIG. 7B, another alternate embodiment is shown. The diameter of the second segment 42 is larger that the diameter of the other segments 40 and 44. Thus, the respective diameters alternate.

Referring now to FIG. 7C, another alternate embodiment is shown. The diameter of the second segment 42 is less that the diameter of the other segments 40 and 44. Thus, the respective diameters again alternate.

Referring now to FIG. 8, another alternate embodiment is shown. The longitudinal axis 24 of the shank 12 is coaxial with the longitudinal axis 62 of the segments 40–44. Thus, the longitudinal axis 24 of the shank 12 within the body portion 34 defines the top portion 76 which is equal in size to the bottom portion 78.

Referring now to FIG. 9, another alternate embodiment is shown. The fishing lure 38 is constructed without a weight portion such that the lure floats on the surface of the water. This effectively attracts fish that typically feed on the surface of the water.

Specific embodiments of the fishing lure with the buoyant body portion according to the invention have been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

I claim:

1. The fishing lure comprising:
   a fishing hook having a shank with a first end and a second opposing end, said first and second ends defining a longitudinal axis of the shank, an eye portion attached to the first end, a curved portion attached to the second end of the shank, a barbed portion attached to the other end of the curved portion, said curved portion curving away from the longitudinal axis of the shank;
   a buoyant body portion on said shank with a portion of the shank being disposed substantially within the body portion, said body portion providing an increased diameter over the diameter of the shank for accepting fly-tying materials affixed thereto;
   said body portion including at least two segments, each of said segments having a length and having a substantially constant diameter along the length different from the diameter of an adjacent segment, for providing a step-like formation facilitating the attachment of said fly-tying materials;
   said length of said at least two segments defining a longitudinal axis of the segments where said longitudinal axis further defines a top portion of the body portion and a bottom portion of the body portion, said top and bottom portions oppositely disposed along the longitudinal axis; and
   wherein the longitudinal axis of said segments diverges from the longitudinal axis of the shank and the top portion is smaller in size than the bottom portion.

2. The fishing lure according to claim 1 wherein one of said at least two segments is adjacent the eye portion and having a first diameter and the other of said at least two segments is disposed adjacent to the curved portion and having a second diameter such that the first and second diameters are unequal.

3. The fishing lure according to claim 2 wherein the first diameter is less than the second diameter.

4. The fishing lure according to claim 2 wherein the first diameter is greater than the second diameter.

5. The fishing lure according to claim 1 wherein the body portion is sufficiently buoyant such that the fishing lure is positively buoyant in water.

6. The fishing lure according to claim 5 wherein a weight operatively coupled to the hook imparts a negative buoyancy to the fishing lure such that the fishing lure is heavier than water.

7. The fishing lure according to claim 6 wherein the weight is disposed toward the eye portion of the shank such that when submerged in water, the buoyant body portion elevates the barb portion relative to the eye portion.

8. The fishing lure according to claim 6 wherein the weight is positioned transverse to the longitudinal axis of the segments and is evenly distributed such that lure is laterally balanced.

9. The fishing lure according to claim 1 wherein the buoyant body portion is foamed.

10. The fishing lure according to claim 1 wherein the buoyant body portion is urethane.

11. A fishing lure comprising:
   a fishing hook having a shank, a portion thereof defining a longitudinal axis, said shank having a first end and a second opposing end, an eye portion attached to the first end of the shank, a hook portion attached to the second end of the shank, a barbed portion attached to the distal end of the hook portion;
   a foamed body portion on said shank with a portion of the shank being disposed substantially within the foamed body portion, said foamed body portion providing an increased diameter over the diameter of the shank for accepting fly-tying materials affixed thereto;
   said body portion including a plurality of segments, each of said segments having a length, each segment having a substantially constant diameter along the length with adjacent segments having unequal diameters;
   a boundary between adjacent segments defining a shoulder disposed at a substantially right angle to the length of said segments for providing a step-like formation for facilitating the attachment of said fly-tying materials;
   said length of said segments defining a longitudinal axis of the segments such that the longitudinal axis further defines a top portion of the foamed body portion and a bottom portion of the foamed body portion, said top and bottom portions oppositely disposed along the longitudinal axis of the segments; and
   said segments disposed toward the eye portion having a lesser diameter than segments disposed toward the hook portion for imparting a streamlined contour.

12. The fishing lure according to claim 11 wherein the foamed body portion is sufficiently buoyant such that the fishing lure is positively buoyant in water.

13. The fishing lure according to claim 11 wherein a weight operatively coupled to the hook imparts a negative buoyancy to the fishing lure such that the fishing lure is heavier than water and sinks therein.

14. The fishing lure according to claim 13 wherein the weight is disposed toward the eye portion of the shank such that when submerged in water, the foamed body portion elevates the barb portion relative to the eye portion.

15. The fishing lure according to claim 13 wherein the weight is positioned transverse to the longitudinal axis of the segments and is evenly distributed such that lure remains laterally balanced.

16. The fishing lure according to claim 11 wherein the longitudinal axis of the segments is not coaxial with the longitudinal axis of the shank such that the foamed body portion is offset from the shank portion and the top portion of the foamed body portion is smaller than the bottom portion of the body foamed portion.

17. The fishing lure according to claim 11 wherein the longitudinal axis of the segments is coaxial with the longitudinal axis of the shank and the top portion of the foamed body portion is equal in size to the bottom portion of the foamed body portion.

* * * * *